United States Patent

McElroy et al.

[15] 3,678,121

[45] July 18, 1972

[54] PREPARATION OF TELOMERIC LIQUID POLYBUTADIENE OILS

[72] Inventors: Bobby Joe McElroy, York, S.C.; Joseph Herbert Merkley, Gastonia, N.C.

[73] Assignee: Lithium Corporation of America, New York, N.Y.

[22] Filed: Jan. 22, 1971

[21] Appl. No.: 109,002

[52] U.S. Cl. .................................260/668 B, 260/94.2 M
[51] Int. Cl. .................................................C07c 15/02
[58] Field of Search..........260/668 R, 668 B, 669 P, 94.2 M, 260/84.7

[56] References Cited

UNITED STATES PATENTS

| | | | |
|---|---|---|---|
| 3,317,918 | 5/1967 | Foster | 260/94.2 M |
| 3,331,826 | 7/1967 | Talcott | 260/94.2 M |
| 3,468,970 | 9/1969 | Screttes | 260/668 B |
| 3,324,191 | 6/1967 | Wofford | 260/669 P |
| 3,579,492 | 5/1971 | Smith | 260/668 B |

Primary Examiner—Curtis R. Davis
Attorney—Wallenstein, Spangenberg, Hattis & Strampel

[57] ABSTRACT

Preparation of telomeric liquid polybutadiene oils by the telomerization of 1,3-butadiene with toluene in the presence of a complex of a polylithio hydrocarbon with tetramethylethylenediamine, at a temperature of about 40°–110° C at atmospheric pressure.

24 Claims, No Drawings

PREPARATION OF TELOMERIC LIQUID POLYBUTADIENE OILS

BACKGROUND OF THE INVENTION

The preparation of liquid (and solid) butadiene polymers derived from 1,3-butadiene is shown, for instance, in U.S. Pat. No. 3,451,988. However, processing factors detract from the uniformity and reproducibility of the polymers described therein, as will be shown later.

Liquid polybutadienes of narrow molecular weight distribution are valuable products possessing a wide variety of applications. Their low viscosity and high unsaturation make them valuable in a variety of curing applications, for example, in the thermosetting resin and rubber fields.

Presently, commercially available and heretofore suggested liquid polybutadienes are generally prepared by two types of processes. One of these involves the sequential attachment of 1,3-butadiene monomer to an organometallic initiator compound without purposeful termination of the growing chain end by chain transfer.

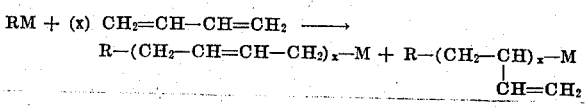

(R is lower alkyl, and M is Li, Na, K, Mg or Al)

The second process involves the use of a free radical initiator compound with purposeful chain termination by the radicals formed in the process.

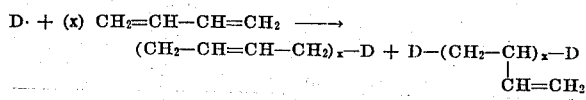

(D· is ·CBr$_3$ or ·OH)

The free radical initiator compounds generating the above radicals are CBr$_4$ and H$_2$O$_2$.

In the first process described above, using an aluminum organometallic, chain transfer may be accomplished by the addition of nickel powder. However, the conversions of butadiene are relatively low, being in the order of 80–85 percent. Yields are also low, being in the order of only 5 to 10 lbs. of polybutadiene per equivalent of aluminum organometallic. These factors raise the cost of the liquid polybutadiene produced by the process. The cost of the polybutadiene produced by the organometallic process involving no chain-transfer is even higher because a lower yield of product per equivalent of organometallic is realized. Thus, for example, the yield of a typical liquid polybutadiene possessing a molecular weight of approximately 2000 is commonly less than 5 lbs. per equivalent of organometallic. The yield improves as the molecular weight of the polybutadiene is increased by further monomer additions, but eventually the viscosity of the resulting liquid polybutadiene becomes too high for use in most desired applications.

In the second process described above, namely, the free radical initiator process involving radical termination, said process is difficult to control and polybutadienes with quite broad molecular weight distributions are generally obtained. In addition, the terminating radicals, such as hydroxyl, often strongly affect the polar character of the liquid polybutadiene produced, decreasing the hydrophobic or hydrocarbon-like features of the polymer. Thus, for certain applications, such as for electrical potting compounds, electrical resistivity may be lower than desired.

U.S. Pat. No. 3,451,988, referred to above, describes a process for producing polybutadienes using an organometallic initiator compound, such as n-butyllithium, in conjunction with a di-tertiary amine, such as N,N,N′,N′-tetramethylethylenediamine. In this process, chain transfer is effected in the presence of aromatic compounds, such as benzene, toluene or xylene (where BD is used it means 1,3-butadiene)

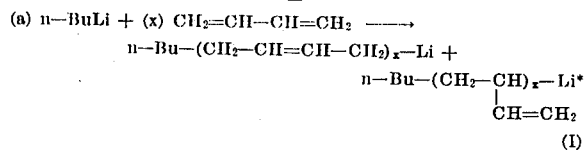

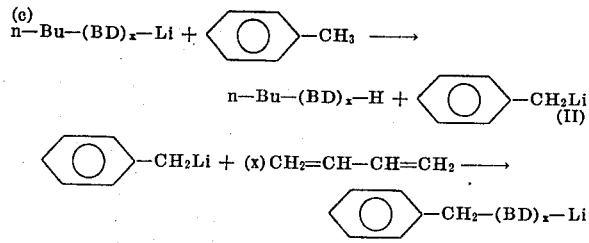

* (I) and (II) may be collectively expressed as n—Bu—(BD)$_x$—Li

SUMMARY OF THE INVENTION

In accordance with the present invention, there is provided a novel method of producing novel telomeric liquid polybutadiene oils. The telomeric liquid polybutadiene oils of the present invention differ substantially from other known or commercially available liquid polybutadienes. Thus, the telomeric liquid polybutadiene oils of the present invention contain one benzene ring per polymer chain, whereas other commercially available liquid polybutadienes generally contain none. In addition, each polymer chain contains approximately 20 to 25 percent of 6-membered, saturated cyclic (r-ing) structures. Moreover, the telomeric liquid polybutadiene oils of this invention posses a relatively narrow molecular weight distribution.

The method involves telomerization of 1,3-butadiene with a C$_1$-C$_4$ alkyl benzene, particularly toluene, and wherein the telomerization is initiated by a coordination complex of a polylithio, particularly a dilithio, hydrocarbon, especially a dilithio adduct of a conjugated polyene hydrocarbon, with tetramethylethylenediamine (TMEDA) or certain other aliphatic tertiary amines, at a temperature range of 40° to 110° C, particularly at atmospheric pressure.

Telomeric liquid polybutadiene oils can be produced, in accordance with the present invention, having molecular weights from about 500 to about 3000 and possessing viscosities of from about 1 poise to about 5000 poise (25° C). Commonly, about 50–60 pounds of oil are produced for each gram equivalent weight of lithium in the catalyst.

In a typical reaction, gaseous 1,3-butadiene is passed into a vigorously stirred solution of a 1:1 coordination complex of the dilithio adduct of isoprene and TMEDA in toluene at ambient temperature under an inert atmosphere (e.g. nitrogen or argon). The heat of reaction is allowed to raise the mass temperature to the desired reaction temperature, where it is controlled by external cooling. Reaction with the butadiene is substantially instantaneous. When the required amount of butadiene has been added, the reaction mass is stirred for a short time, hydrolyzed with water, washed several times with more water, and finally stripped of solvent in a flash evaporator to recover the telomeric liquid polybutadiene oil.

While, as stated above, toluene is especially preferred (as the taxogen) in the preparation of the telomeric liquid polybutadiene oils of the present invention, other C$_1$-C$_4$ alkyl benzenes can be utilized such as ethyl benzene, diethyl benzene, isopropyl benzene, diisopropyl benzene, butyl benzene, isobutyl benzene, and the xylenes such as o-xylene, p-xylene, m-xylene, and mixtures of any two or more thereof.

While 1,3-butadiene is especially desirable as the conjugated diene hydrocarbon for use in telomerizing the toluene or other C$_1$-C$_4$ alkyl benzene, other C$_4$-C$_8$ carbon atom 1,3-conjugated dienes can be used such as isoprene; 2,3-dimethyl-1,3-butadiene; 2-methyl-3-ethyl-1,3-butadiene and others such as are disclosed, for example, in U.S. Pat. No. 3,377,404.

The polylithio hydrocarbon catalysts which are used in the practice of the method of the present invention include, among others, dilithioisoprene; dilithiobutadiene; 2,4-dilithio,2,4-diphenylhexane; 1,4-dilithio-1,1,4,4-tetraphenylbutane and 1,8-dilithio-2,3,6,7-tetramethyl-octa-2,6-diene, and other dilithio adducts of other polyene hydrocarbons as shown, for instance, in U.S. Pat. No. 3,388,178 the disclosure with respect thereto being herewith incorporated by reference. Other polylithio hydrocarbons which can be used are alkylene dilithiums such as 1,4-dilithiobutane; 1,5-dilithiopentane; 1,6-dilithiohexane, as well as such dilithio compounds as 4,4-dilithiobiphenyl. Polylithio hydrocarbons in which there are 3 or 4 lithiums in the molecule are shown, for instance, in U.S. Pat. No. 3,377,404 the disclosure of which with respect thereto is herewith incorporated by reference. As shown in said U.S. Pat. No. 3,377,404, the polylithioorganics therein described can be identified by the formula $RLi_x$ where $x$ is an integer from 2 to 4, and R is a hydrocarbon radical selected from the group consisting of aliphatic, cycloaliphatic and aromatic radicals. It is especially desirable to utilize dilithio adducts of such conjugated polyene hydrocarbons as isoprene and 1,3-butadiene.

With reference to the cocatalyst, while N,N,N',N'-tetramethylethylenediamine (TMEDA) is especially satisfactory for use in the practice of the present invention, other aliphatic tertiary amines can be utilized among which may be mentioned azaoxa-alkanes, aza-alkyloxacycloalkanes or oxa-alkylazacycloalkanes of the formulas:

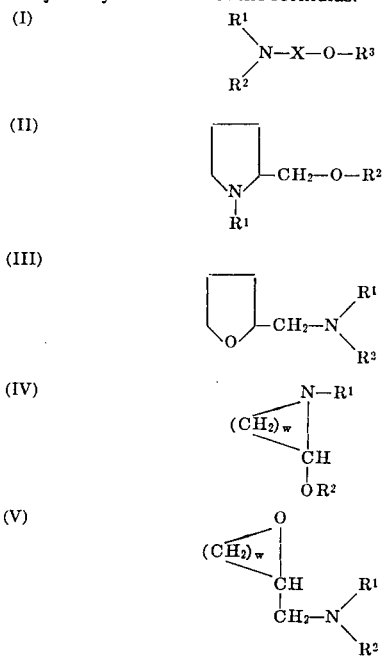

where $R^1$, $R^2$, and $R^3$ are the same or different alkyls each containing from 1 to 4 carbon atoms, namely methyl, ethyl, n-propyl, isopropyl, n-butyl, isobutyl and t-butyl; X is a non-reactive group such as

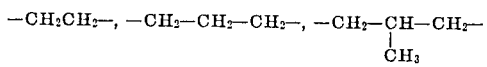

or other divalent aliphatic hydrocarbon or alkylene radical, preferably containing from 2 to 4 carbon atoms; and $w$ is 1 to 4. Illustrative examples include, for instance, 2-dimethylaminoethylmethylether [ $(CH_3)_2$-N-$CH_2$-$CH_2$-$OCH_3$ ]; 2-diethylaminoethylmethyl ether [ $(C_2H_5)_2$-N-$CH_2$-$CH_2$-$OCH_3$]; and 2-dimethylaminopropylmethyl ether [ $(CH_3)_2$-N-$CH_2$-$CH_2$-$CH_2$-$OCH_3$].

TMEDA and generally functionally equivalent aliphatic tertiary amines are disclosed in the aforementioned U.S. Pat. No. 3,451,988. Such aliphatic tertiary amines, as there disclosed, include, among others, those which are represented by the formulas:

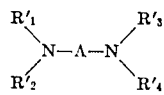

and

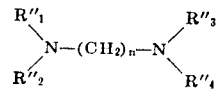

wherein $R'^1$, $R'^2$, $R'^3$ and $R'^4$ are the same or different alkyl radicals of 1 to 5 carbon atoms, inclusive; A is a non-reactive group; $R''^1$, $R''^2$, $R''^3$, and $R''^4$ are the same or different alkyl radicals of 1 to 3 carbon atoms, inclusive, and $n$ is an integer between 1 and 4, inclusive. The disclosure of said aliphatic tertiary amines in said patent is incorporated herein by reference.

The catalyst system, comprising the complex of the polylithio hydrocarbon and the TMEDA or other herein disclosed type of aliphatic tertiary amine, can be preformed, for instance, in an inert ether such as dimethyl ether or an aliphatic hydrocarbon solvent, and then admixed with the toluene. However, it is generally more advantageous to form said complex in situ by separate addition of the polylithiohydrocarbon and the cocatalyst to the toluene. In general, the mol ratio of the polylithio hydrocarbon to the aforesaid aliphatic tertiary amine is most desirably substantially 1:1 but it may range from about 1 to 2, especially 1.5 to 2, of the polylithio hydrocarbon to 1 of the aliphatic tertiary amine.

In certain instances, the reaction to produce the liquid polybutadiene oils can be carried out in the presence of aliphatic (including cycloaliphatic) hydrocarbon solvents such as n-heptane, n-hexane, n-octane, isooctane, cyclopentane, cyclohexane, cyclooctane and mixtures of any two or more thereof, but it is especially desirable to avoid such usage since, among other disadvantages, the presence of such aliphatic hydrocarbon solvents tends to produce telomeric products of higher molecular weight than is normally desired.

In certain instances, the reaction mixture may contain small proportions of ethers, as where, for instance, the ether is present in the solution of the polylithio adduct of the conjugated polyene hydrocarbon, as said adduct is produced. Dimethyl ether as well as other ethers may be employed, as shown, for example, in the aforementioned U.S. Pat. No. 3,388,178. Ethers, however, are not an essential ingredient of the reaction mixtures used in the practice of the present invention.

The polylithio hydrocarbons, notably the dilithio adducts of the conjugated polyene hydrocarbons, will, in all cases, be present in small proportions relative to the amount of toluene and the same is true of the TMEDA or other stated aliphatic tertiary amine. The amount of 1,3-butadiene utilized in relation to the toluene will in all cases be from one to several times greater by weight and will, in most cases, contribute the bulk of the final product solution.

The molecular weights of the telomeric liquid polybutadiene oils produced in accordance with our invention can be varied over a relatively wide range by varying the three parameters of temperature, butadiene feed rate and catalyst/cocatalyst ratio. For example, as the dilithioisoprene/TMEDA ratio is varied from 0.5 to 2, the viscosity (and thus, the molecular weight) of the resulting telomeric liquid polybutadiene oil increases in a generally linear fashion from about 5 to about 150 poise, illustratively at a temperature of reaction of 110° C and at a butadiene feed rate of 2.5 liters per minute.

The variation of molecular weight with temperature is shown, in Table I, to decrease with an increase in temperature in a generally regular manner such as to give a linear plot of log $\overline{M}_n$ against $1/T°K$.

TABLE I

MOLECULAR WEIGHT VS. REACTION TEMPERATURE

| Reaction Temperature (°C) | | $\overline{M}_n$ |
|---|---|---|
| 65– | 70 | 2220 |
| 70– | 75 | 1868 |
| 85– | 90 | 1413 |
| 100– | 103 | 932 |

Lower temperatures may be employed to give still higher molecular weights, but, for most applications, temperatures are varied between 40° and 110° when operating at atmosphere pressure.

The variation of molecular weight is least sensitive to a variation in the gaseous 1,3-butadiene feed rate over a range of 2 to 10 liters of 1,3-butadiene per minute (t=110° C) as shown in Table II.

TABLE II

MOLECULAR WEIGHT VS. 1,3-BUTADIENE FEED RATE

| BD Feed (liters/min) | $\bar{M}_n$ |
| --- | --- |
| 2.5 | 700 |
| 7.5 | 1050 |
| 10.0 | 1200 |

The variation of $\bar{M}_n$ with butadiene feed rate, like $\bar{M}_n$ versus catalyst/cocatalyst ratio, is also a generally linear relationship.

The most useful reaction parameter for accomplishing a regular variation of the molecular weight of the telomeric liquid polybutadiene oils is, thus, shown to be temperature. A close control over the molecular weight of these oils can be exerted by careful regulation of the temperature within definite limits. Table III shows 4 separate reactions made at 85°–90 C and 6 separate reactions made at 100°–103° C. $\bar{M}_n$ was determined by vapor pressure osmometry, which gives a precision of ±5 percent.

TABLE III

REPRODUCIBILITY OF MOLECULAR WEIGHT

| T(°C) | $\bar{M}_n$ |
| --- | --- |
| 85–90 | 1550 |
|  | 1358 |
|  | 1490 |
|  | 1467 |
| 100–103 | 910 |
|  | 1020 |
|  | 890 |
|  | 1010 |
|  | 1000 |
|  | 999 |

The viscosities of the telomeric liquid polybutadiene oils vary regularly with their molecular weights, according to the relation:

$$\log n = A\bar{M}_n^{1/2} + K$$

where A and K are constants and $n$ is the viscosity as determined by ASTM D1824-66.

It may be noted that, although the aforesaid U.S. Pat. No. 3,451,988 refers to the production of substantially liquid polydiolefins with a viscosity average molecular weight of about 200 to about 30,000 by the incorporation of an aromatic diluent, which acts as a chain transfer agent during the polymerization process; and that the point at which the polymeric chain is terminated and, thus, the resulting value of the viscosity average molecular weight of the liquid polymer, depends upon the particular aromatic diluent selected and the temperature of the polymerization reaction, which can be as low as 0° C or as high as 100° C, the actually disclosed working Examples do not result in producing narrow range low molecular weight polybutadiene as such. Indeed, in Example 14 where benzene is used as the aromatic diluent, two products are produced; one described as "gummy solids," and the other as "considerable amounts of low molecular weight soluble polymer." The polybutadienes obtained in examples F, G and H of Table IX, which are low molecular weight liquids, are identifiable with the "low molecular weight soluble polymer" fraction of the product. However, no mention is made therein of the physical properties of the "gummy solids" fraction of the product. In Example 15, where toluene is the aromatic diluent, no precipitation technique was used, and thus, the presence of two different products is not indicated. The fact is, however, that when one carries out said Example 15 and then isolates the polymers by removal of the solvent, a mixture of two products is obtained, one, a low-molecular weight liquid polymer, the other a semi-solid rubbery polymer. Indeed, the polymer inherent viscosity of 1.01 dl/g given for the product (K, Table X, Col. 18) is substantially higher than that given in Example 14 using benzene as the aromatic diluent but using otherwise essentially identical conditions and indicates that the product has an average molecular weight greater than 10,000, which is not in the liquid range.

A significant aspect of our invention resides in the fact that it enables the production of telomeric liquid poly-butadiene oils possessing a relatively narrow molecular weight distribution ($\bar{M}_w/\bar{M}_n$ = 1.5 to 3) and a predetermined molecular weight. Thus, our invention allows one to obtain telomeric liquid polybutadiene oils of any desired number average molecular weight from about 500 to about 3000 as such without the production of substantial quantities of gummy or rubbery solids such as are obtained in practicing the process of the said U.S. Pat. No. 3,451,988. This eliminates the necessity for making what are frequently difficult separations and enables the production of high yields of liquid polybutadiene oils as such in accordance with our invention.

The practice of the method of our invention involves a controlled incremental feed of the 1,3-butadiene, or other conjugated butadiene, to the reaction vessel by the continuous passage or flow thereof as a gas into a rapidly stirred reaction mixture containing toluene, or other $C_1$-$C_4$ alkyl benzene, and the aforementioned polylithio hydrocarbon catalyst and tertiary aliphatic amine cocatalysts. This continuous gaseous feed obtains throughout the reaction. The result is that very little detectable conjugated butadiene is present at any point during the reaction and the reaction is essentially complete when the said butadiene feed is discontinued. This allows one to obtain liquid polybutadiene oils possessing a narrow molecular weight distribution and no high molecular weight solid impurities.

In regard to the control of reaction temperature to effect variations in the molecular weight of these polymers made by chain-transfer, although the specification of said U.S. Pat. No. 3,451,988 mentions that reaction temperature variations will affect the molecular weights of the resulting polybutadienes produced in aromatic solvents, the only example of this teaching is given in Table IX, Example 14. Here, it is shown that increasing the reaction temperature increases the molecular weight of the resulting polybutadienes, where benzene is used as the aromatic solvent and chain-transfer agent. However, in our invention, the opposite situation prevails, i.e., increasing the reaction temperature decreases the molecular weight of the resulting polybutadiene (see Tables I and III of the present specification). This is a wholly unexpected teaching which allows very close control over the molecular weights of the liquid polybutadiene oils between 500 and 3000.

We have found it to be critically important, in the practice of our invention, to avoid placing all of the conjugated butadiene in contact with the catalyst-cocatalyst combination at the start of the reaction. In the practice of our invention, any instantaneous conjugated butadiene concentrations are very low due to continuous nature of the gaseous feed. This enables reactions to be started at any desired temperature even up to the reflux temperature of the aromatic hydrocarbon (110° C for toluene), without the danger of the occurrence of rapid or uncontrollable polymerization. This controlled incremental gaseous butadiene feed, coupled with close temperature control, also allows the achievement of high final polymer concentrations in the reaction media, in fact, much higher concentrations (75-80 weight percent) than are obtainable in most conventional polymerizations where all of the monomer is present initially. This is especially true in those cases where high catalyst to monomer ratios obtain. Such high ratios are generally required to produce low molecular weight liquid polybutadienes where no chain-transfer agent is present. U.S. Pat. No. 3,451,988 describes such polymerizations with high 1,3-butadiene concentrations carried out in the absence of aromatic chain transfer agents (Example 16). However, a relatively low catalyst/monomer ratio is employed and the polybutadiene obtained is a rubbery solid, not a liquid. Such a "bulk" 1,3-butadiene (b.p. ca. 0° C) polymerization cannot normally be carried out in conventional non-pressurized equipment except at relatively low temperatures (−10° to 0° C). Thus, both the low monomer/catalyst ratio and the low reaction temperature, even in the presence of aromatic chain-transfer agents, would lead to higher molecular weight, non-liquid polymers as, for instance, in Example 16, where a rubbery, solid polybutadiene with a molecular weight of 78,000 is produced.

The telomeric liquid polybutadiene oils obtainable by our invention, as indicated above, are themselves unique and novel products which possess favorable intrinsic structural characteristics which lend themselves to applications such as insulating materials in the electrical products field, both as coating and as "potting" compounds. As is well known to those skilled in the art, polybutadienes generally possess mixed microstructures consisting of various combinations of 1,2 and 1,4 (cis and trans) segments, which combinations depend upon the type of polymerization initiation process (organometallic or free radical) used. Thus, for example, the aluminum organometallic initiator-system produces a predominantly cis-1,4 microstructure (ca. 80 percent) while the sodium organometallic initiator system produces a predominantly 1,2-microstructure (ca. 80 percent). On the other hand, the free radical initiator system, as exemplified by the use of hydrogen peroxide as an initiator, generally produces a microstructure which is predominantly trans-1,4 (ca. 60 percent), but also contains significant quantities of cis-1,4 (ca. 20 percent) and 1,2 (ca. 20 percent) segments.

The practice of our invention produces a predominantly vinyl or 1,2 microstructure. Unlike the commercially available high 1,2-polybutadienes, or the liquid polybutadienes obtained pursuant to the aforesaid U.S. Pat. No. 3,451,988, however, the telomeric liquid polybutadiene oils of our invention possess, in addition to about 50–60 percent of vinyl linkages, and about 15–25 percent of 1,4 linkages (mostly trans), approximately 25 percent of cyclic linkages resulting from an intramolecular cross-linking mechanism. This latter unexpected and novel characteristic of our telomeric liquid polybutadiene oils serves to strengthen the polymer through a ladder-like structure and also leads to harder peroxide-cured resins than are available from conventional high 1,2-polybutadienes. In addition, as stated above, our telomeric liquid polybutadiene oils possess one benzene ring per polymer chain whereas other commercially-available polybutadienes generally contain none or essentially none. Typical compositions and microstructures for these telomeric liquid polybutadiene oils are shown below in Tables IV and V.

TABLE IV

MICROSTRUCTURE OF TELOMERIC LIQUID POLYBUTADIENE OILS

|  | Low Molecular Wt. | Medium Molecular Wt. | High Molecular Wt. |
|---|---|---|---|
| Molecular Wt. | 800 | 1400 | 2300 |
| Chemical Composition |  |  |  |
| Terminal Phenyl | 9 | 5.5 | 3 |
| Polybutadiene | 91 | 94.5 | 97 |
| Microstructure (%) |  |  |  |
| Vinyl | 60 | 55 | 50 |
| Trans-1,4 | 16 | 22 | 14 |
| Cis-1,4 | 1 | 3 | 9 |
| Cyclic | 23 | 25 | 22 |

TABLE V

| Chemical Composition (%) |  |  |  |
|---|---|---|---|
| Terminal Phenyl | 10 | 7 | 5 |
| Polybutadiene | 90 | 93 | 95 |
| Approximate Microstructure (%) |  |  |  |
| Vinyl | 60 | 60 | 60 |
| Trans 1,4 | 15 | 15 | 15 |
| Cis 1,4 | nil | nil | nil |
| Cyclic | 25 | 25 | 25 |
| Molecular Weight | 900 | 1300 | 1800 |
| Physical State | oil | viscous oil | viscous oil |
| Viscosity at 25° (Poise) | 22 | 150 | 2000 |
| Viscosity at 50° (Poise) | 4 | 18 | 100 |
| Iodine Number | 294 | 310 | 313 |
| Low Boilers, % by weight | 1 | 1 | 1 |
| Density, 25° C, gm/cc | 0.93 | 0.93 | 0.93 |
| Density, 25°C, lbs./gal. | 7.8 | 7.8 | 7.8 |
| Pour Point, °C | −10 | 15 | 25 |

An idealized segmented chemical structure representing the telomeric liquid butadiene oils of the present invention is shown below, in that case where the approximate unsaturation present is 60 percent vinyl, 15 percent trans 1,4, and the remaining 25 percent of initial unsaturation has been internally cyclized.

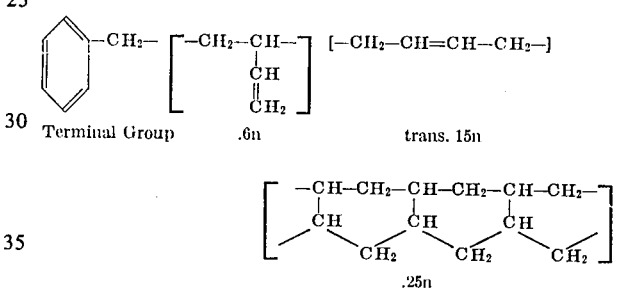

The following specific examples are given as illustrative but in no way limitative of the practice of the invention. It will be understood that numerous other examples will readily occur to those skilled in the art in the light of the novel guiding principles and teachings disclosed herein. In these particular examples, both laboratory and plant-sized reactions are described to illustrate the wide variation in size of the reaction systems which can be employed to produce these telomeric liquid polybutadiene oils. In most cases, the toluene was distilled over sodium hydride or sodium metal before use, and the 1,3-butadiene (Phillips Petroleum Co.'s Rubber Grade) was passed through Linde molecular sieves (4A) before use. All temperatures recited are in degrees Centigrade.

The first three examples given below are laboratory runs, the second three examples are actual pilot plant runs (40 gallon).

EXAMPLE 1

Preparation of a Low Molecular Weight Telomeric Liquid Polybutadiene Oil 36 ml of a 1 N solution of dilithioisoprene in benzene-dimethyl ether* was dissolved in 400 ml of toluene and the solution heated to 100°. 10 ml of anhydrous TMEDA was added slowly and then gaseous 1,3-butadiene was passed into the solution at a rate of 2.5 l per minute for a period of two hours under conditions of vigorous agitation. External water bath cooling controlled the reflux rate during the reaction. After addition of 1,3-butadiene was complete, the reaction was quenched with 1 ml of water. 30 g of NaHCO$_3$ powdered was then added and the mixture filtered. The filtrate was stripped on a flash evaporator to remove excess toluene. 797 g of a clear, light yellow, mobile liquid was obtained having a molecular weight of 685 and a viscosity (23°) of 5.3 poise. The yield of product was 52 lbs. per equivalent of catalyst.

EXAMPLE 2

Preparation of a Medium Molecular Weight Liquid Polybutadiene Oil

Example 1 was repeated except that the gaseous 1,3-butadiene flow rate was 7.5 l per minute instead of 2.5 l per minute. After workup, 857 g of a clear, pale yellow, mobile liquid was obtained (yield: 57 lbs/equivalent of catalyst) having a viscosity of 22.6 poise at 25° and a molecular weight of 1070. Its iodine number was 278. The product possessed a molecular weight distribution $\overline{M}_w/\overline{M}_n$ of 1.73 which is very narrow.

EXAMPLE 3

Preparation of a High Molecular Weight Telomeric Liquid Polybutadiene Oil

To 5 l of toluene was added 25 ml of TMEDA and 100 ml of 1 N dilithioisoprene solution and the solution heated to 100°. Gaseous 1,3-butadiene was passed into the vigorously stirred solution at a rate of 8 to 10 l per minute, for a period of 14 hours. Dry ice-hexane was used as an external coolant to control the reflux rate. A dry ice-hexane mixture was used to cool the reflux condenser. Approximately 15 to 20 ml of catalyst solution was added every two hours until a total of 400 ml of catalyst solution had been added altogether. After 6 hours, 1 l of toluene and 25 ml of TMEDA was added. On workup, 9 l of a clear, yellow viscous oil was obtained, giving a yield of 46 lbs. of telomeric liquid polybutadiene oil per equivalent of catalyst. The said liquid oil had a viscosity of 374 poise at 57.5° and a molecular weight of 2803.

EXAMPLE 4

Preparation of a Low Molecular Weight Telomeric Liquid Polybutadiene Oil

The following quantities of raw materials were employed in a 40 gallon run:
- 75 lbs. toluene (10.37 gals)
- 2.85 equivalents of dilithioisoprene solution (as in Example 1)
- 1.66 moles of TMEDA
- 162 lbs of gaseous 1,3-butadiene The following reaction parameters were employed:
- Temperature – 100°–103°
- Butadiene Feed Rate – 12.5 lbs/hr.
- Catalyst added incrementally during reaction The toluene, previously passed through a drying column to remove traces of moisture, was pumped into a closed reactor vessel previously purged of air by a stream of gaseous nitrogen. The reaction vessel was connected to a reflux condenser provided with chilled solvent cooling. The dilithioisoprene solution and the TMEDA were added to the toluene in the reactor vessel with vigorous agitation over a period of 10 minutes. Then the addition of the gaseous 1,3-butadiene was begun. The temperature of the reaction mass was then allowed to rise to 100°–103° due to the heat of the exothermic reaction. Cooling was applied to the reactor to control the reaction temperature within said range during the addition of the 1,3-butadiene. At the conclusion of the addition of the specified amount of the gaseous 1,3-butadiene, the reacted mixture was cooled to 30°–40°. The reacted mixture was then water washed continuously in a standard mixer-settler unit. The resulting washed organic was then subjected to organic solvent stripping in a thin-film evaporator unit. There was recovered 183 lbs. (64.1 lbs. per equivalent of catalyst) of a clear, light yellow telomeric liquid polybutadiene oil having a molecular weight of 825. Butadiene conversion was 96.7 percent.

EXAMPLE 5

Preparation of a Medium Molecular Weight Telomeric Liquid Polybutadiene Oil

Example 4 was repeated except that the reaction temperature was maintained at 85°–90° instead of 100°–103°. After workup, 175 lbs. of a fluid, light yellow oil having a molecular weight of 1200 was obtained. The yield of product was 61.4 lbs per equivalent of catalyst and the butadiene conversion was 96.3 percent.

EXAMPLE 6

Preparation of a High Molecular Weight Telomeric Liquid Polybutadiene Oil

Example 4 was repeated except that the reaction temperature was maintained at 65°–70°. On workup, the yield of viscous, light yellow oil was 53.4 lbs. per equivalent of catalyst. The molecular weight of the oil was found to be 2220.

Additional examples of the practice of the present invention are set forth in the following Table VI.

TABLE VI

| Experiment number | Rx size (liter) | Catalyst (eq.) | Co-catalyst (ml.) | Feed rate (l./min.) | Reaction temp. | Yield (g.) | Viscosity (T° C.) | Iodine number | Mol. wt. | Low boilers (z) | Toluene PhCH₂(BD)ₙ | Yield, lb./eg. of catalyst |
|---|---|---|---|---|---|---|---|---|---|---|---|---|
| 7 | 2 | DiLi-1 (.033) | TMEDA (5) | 1.0 | 40 | 800 | 163P (60) | | 2,200 | | | 52 |
| 8 | 2 | DiLi-1 (.033) | Am.Et. (5) | 1.7 | 110 | 720 | 22P (22) | | 782 | 3 | 10 | 47 |
| 9 | 2 | DiLi-1 (.034) | TMEDA (5) | 7.5 | 110 | 857 | 22.6P (25) | 278 | 1,070 | 17 | 5.9 | 57 |
| 10 | 2 | DiLi-1 (.034) | TMEDA (5) | 7.5 | 110 | 795 | 1,066P (22) | | 1,600 | | | 53 |
| 11 | 2 | DiLi-1 (.033) | TMEDA (5) | 2.5 | 104 | 786 | 82P (23) | 294 | 1,200 | | | 51 |
| 12 | 2 | DiLi-1 (.033) | TMEDA (10) | 2.5 | 110 | 797 | 5.3P (23) | | 685 | | | 52 |
| 13 | 2 | DiLi-1 (.033) | TMEDA (2.5) | 2.5 | 110 | 700 | 143P (24) | 303 | 1,300 | | | 46 |
| 14 | 2 | DiLi-1 (.033) | TMEDA (5) | 10 | 110 | 633 | 455P (23) | | 1,450 | | | 41 |
| 15 | 2 | DiLi-1 (.033) | TMEDA (5) | 1.7 | 60 | 990 | 202P (58) | | 2,400 | | | 65 |
| 16 | 2 | DiLi-1 (.034) | Am. Et. (5) | 1.7 | 110 | 584 | 22P (22) | | 850 | | | 38 |

Low boilers=PhCH₂(BD)ₙ, n=1, 2, 3, 4, 5.
DiLi-1=Dilithioisoprene produced as shown in Example 1 of U.S. Patent 3,388,178.
Amount Et=dimethylamino-2-ethoxyethane.

Telomeric liquid polybutadiene oils which are most desirably produced in accordance with the present invention are those which may conveniently be characterized as having (a) low molecular weight, (b) medium molecular weight, and (c) high molecular weight. These may be identified and characterized as follows:

a. Low Molecular Weight Telomeric Liquid Polybutadiene Oils

Those having a molecular weight range of about 500 to 1000. They are generally clear, water-white to light yellow or amber fluid oils having viscosities ranging from about 1 poise to about 20 poise (25°), an iodine number in the range of about 250–300, and a specific microstructure as follows:
- One phenyl group per molecular chain
- About 50–60 percent of butadiene linkages, 1,2 or vinyl
- About 15–25 percent of butadiene linkages, 1,4 (mostly trans)
- About 20–25 percent of cyclic (ring) structures b. Medium Molecular Weight Telomeric Liquid Polybutadiene Oils Those having a molecular weight range of in excess of 1000 to 2000. They are generally clear, water-white to light yellow or amber fluid oils having viscosities of from about 20 poise to about 2000 poise (25°), an iodine number in the range of about 250–300, and a specific microstructure as described in (a) above.

c. High Molecular Weight Telomeric Liquid Polybutadiene Oils

Those having a molecular weight range of in excess of 2000 to about 3000. They are generally clear, water-white to light yellow or amber fluid oils having viscosities of from about 100 poise to about 1000 poise (60°), an iodine number in the range of about 250–300, and a specific microstructure as described in (a) above.

Due to the fact, as indicated above, that the telomeric liquid polybutadiene oils of the present invention possess a number of unsaturated sites, further polymerization can be effected. With peroxide initiators, cross linkage and additional cyclization take place to give hard, tough, temperature-resistant polymeric products. Inorganic or organic fillers may be added to lower costs or to enhance the basic properties of the resins. The telomeric liquid polybutadiene oils can be copolymerized with other unsaturated monomers using peroxide initiation. They also cure in the presence of natural and synthetic rubbers with either peroxide or sulfur. In thin firms, cure can be accomplished by air oxidation (aging), flame curing or even curing. The cure can be accelerated with the use of peroxides or metal naphthenates.

The telomeric liquid polybutadiene oils of the present invention are useful in the production of adhesives, brake linings, castings, coatings, core binders, electrical insulation, enamel wire varnishes, impregnants for paper and other base materials, laminations, molding compounds, varnish formulations, pigments, processing aids, and printing inks. They are amenable to rubber compounding, milling and master-batching (color and chemical). They can be halogenated, epoxidized and adducted with maleic anhydride to obtain special effects and properties.

What is claimed is:

1. A method of preparing telomeric liquid polybutadiene oils which comprises providing a reaction mixture containing a $C_1$-$C_4$ alkyl benzene, a polylithio hydrocarbon catalyst, and a tertiary aliphatic amine cocatalyst selected from the group consisting of those having the general formulas:

(I) 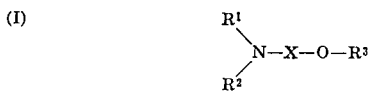

(II) 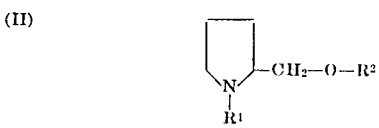

(III) 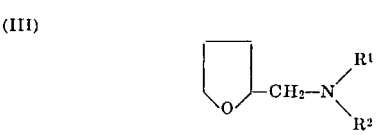

(IV) 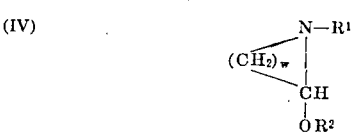

(V) 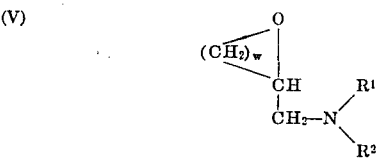

wherein $R^1$, $R^2$ and $R^3$ are $C_1$-$C_4$ alkyls; X is a $C_2$ to $C_4$ divalent aliphatic hydrocarbon or alkylene radical; and $w$ is 1 to 4; and

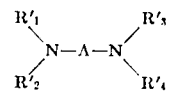

and

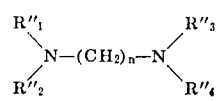

wherein $R'_1$, $R'_2$, $R'_3$ and $R'_4$ are $C_1$-$C_5$ alkyls; A is a non-reactive group, $R''_1$, $R''_2$, $R''_3$, and $R''_4$ are $C_1$-$C_3$ alkyls, and n is an integer between 1 and 4, inclusive, and then gradually adding a gaseous $C_4$-$C_8$ carbon atom 1,3-conjugated diene at a controlled rate while cooling to control the reaction temperature within the range of from about 40° C to below the decomposition temperature of the reactants and the telomeric liquid polybutadiene oil reaction product.

2. The method of claim 1, in which the $C_1$-$C_4$ alkyl benzene is toluene.

3. The method of claim 1, in which the polylithio hydrocarbon catalyst is a dilithioisoprene.

4. The method of claim 1, in which the tertiary aliphatic amine cocatalyst is tetramethylethylenediamine.

5. The method of claim 1, in which the teleomerization reaction is carried out at atmospheric pressure and at a temperature in the range of about 40° to about 110° C.

6. The method of claim 2, in which the tertiary amine cocatalyst is tetramethylethylenediamine.

7. The method of claim 1, in which the 1,3-conjugated diene is 1,3-butadiene.

8. The method of claim 6, in which the 1,3-conjugated diene is 1,3-butadiene.

9. A method of preparing telomeric liquid polybutadiene oils which comprises providing a reaction mixture containing toluene, a catalyst comprising a polylithio hydrocarbon, and tetramethylethylenediamine, and then gradually adding gaseous 1,3-butadiene at a controlled rate while cooling to control the reaction temperature within the range of about 40° to about 110° C.

10. The method of claim 9, in which the polylithio hydrocarbon is a dilithioisoprene.

11. The method of claim 10, in which the reaction is carried out at atmospheric pressure.

12. A telomeric liquid polybutadiene oil resulting from reacting a $C_1$-$C_4$ alkyl benzene with a gaseous $C_4$-$C_8$ carbon atom 1,3-conjugated diene in the presence of a polylithio hydrocarbon catalyst and a tertiary aliphatic amine cocatalyst, said telomeric oil having a molecular weight in the range of about 500 to about 3000, having in its structure one benzene ring per polymer chain, and possessing a predominately 1,2 microstructure, approximately 15 to 25 percent 1,4 linkages (mostly trans), and a substantial percentage of cyclic linkages.

13. A telomeric oil according to claim 12, in which the $C_1$-$C_4$ alkyl benzene is toluene.

14. A telomeric oil according to claim 12, in which the conjugated diene is 1,3-butadiene.

15. A telomeric oil according to claim 12, in which the polylithio hydrocarbon is a dilithio adduct of conjugated diene hydrocarbon.

16. A telomeric oil according to claim 15, in which the polylithio hydrocarbon is a dilithioisoprene.

17. A telomeric oil according to claim 16, in which the tertiary amine is tetramethylethylenediamine.

18. A telomeric liquid polybutadiene oil resulting from reacting toluene with gaseous 1,3-butadiene in the presence of a polylithio hydrocarbon catalyst and a tertiary aliphatic amine cocatalyst, said telomeric oil having a molecular weight in the range of about 500 to about 3000, having in its structure one benzene ring per polymer chain, and possessing a predominantly 1,2 microstructure, approximately 15 to 25 percent 1,4 linkages (mostly trans) and approximately 25 percent cyclic linkages.

19. A telomeric oil according to claim 18, in which the polylithio hydrocarbon is a dilithio adduct of conjugated diene hydrocarbon.

20. A telomeric oil according to claim 19, in which the polylithio hydrocarbon is a dilithioisoprene.

21. A telomeric oil according to claim 20, in which the tertiary amine is tetramethylethylenediamine.

22. A telomeric oil according to claim 18, which has a molecular weight in the range of in excess of 2000 to about 3000; a viscosity in the range of about 100 to about 1000 poise (at 60° C); an iodine number of about 250 to about 300; 1 phenyl group per molecular chain; the microstructure of the polybutadiene fragment of said telomer is vinyl, approximately 50–60 percent; 1,4, mostly trans, approximately 15–25%; and cyclic, approximately 20–25 percent.

23. A telomeric oil according to claim 18, which has a molecular weight in the range of about 500 to 1000; a viscosity of about 1 poise to about 20 poise (at 25° C); an iodine number of about 250 to about 300; 1 phenyl group per molecular chain; the microstructure of the polybutadiene fragment of said telomer is vinyl, approximately 50–60 percent; 1,4, mostly trans, approximately 15–25 percent; and cyclic, approximately 20–25 percent.

24. A telomeric oil according to claim 18, which has a molecular weight in the range of in excess of 1000 to 2000; a viscosity in the range of about 20 to 2000 poise (at 25° C); an iodine number of about 250 to about 300; 1 phenyl group per molecular chain; the microstructure of the polybutadiene fragment of said telomer is vinyl, approximately 50–60 percent; 1,4, mostly trans, approximately 15–25 percent; and cyclic, approximately 20–25 percent.

* * * * *